G. A. FREER.
POTATO DIGGER AND SEPARATOR.
APPLICATION FILED MAR. 5, 1909.

925,691.

Patented June 22, 1909.

Witnesses
E. D. B. Brown
C. H. Griesbauer

Inventor
G. A. Freer,
by H. B. Willson & Co.
Attorneys

THE NORRIS PETERS CO., WASHINGTON, D. C.

UNITED STATES PATENT OFFICE.

GLYNDON A. FREER, OF JACKSON, MICHIGAN.

POTATO DIGGER AND SEPARATOR.

No. 925,691.   Specification of Letters Patent.   Patented June 22, 1909.

Application filed March 5, 1909. Serial No. 481,257.

*To all whom it may concern:*

Be it known that I, GLYNDON A. FREER, a citizen of the United States, residing at Jackson, in the county of Jackson and State of Michigan, have invented certain new and useful Improvements in Potato Diggers and Separators; and I do declare the following to be a full, clear, and exact description of the invention, such as will enable others skilled in the art to which it appertains to make and use the same.

This invention relates to an improved potato digger and separating device.

The object of the invention is to provide simple and efficient means for removing potatoes from the ground and separating them from the surrounding earth removed therewith and depositing them in separated condition on the ground ready to gather up.

With this and other objects in view, the invention consists of certain novel features of construction, combination and arrangement of parts, as will be more fully described and particularly pointed out in the appended claims.

Figure 1:
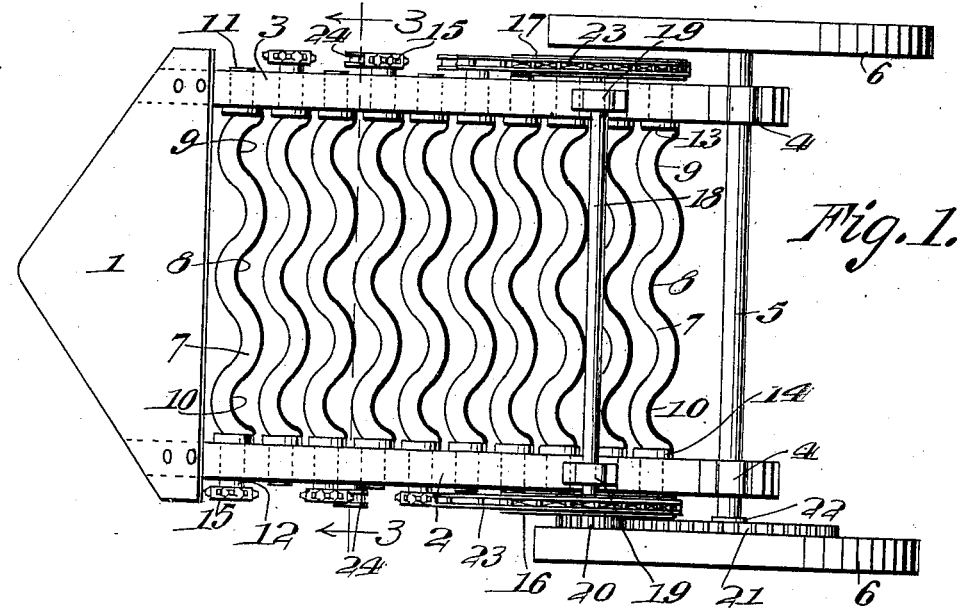
Figure 2:
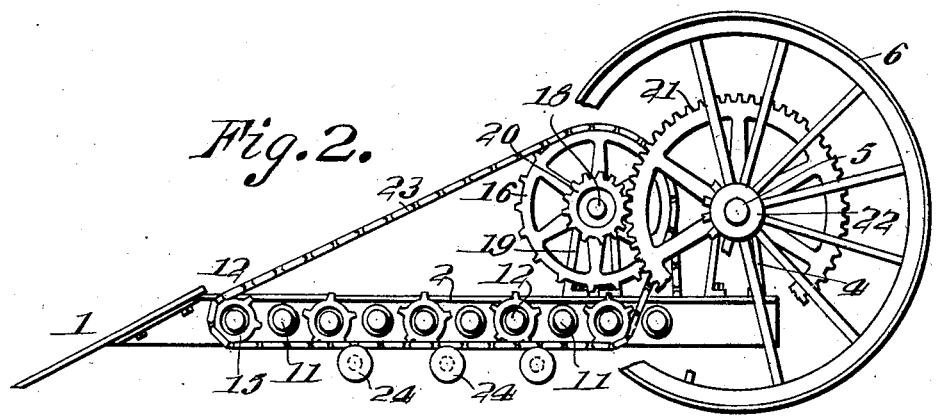
Figure 3:
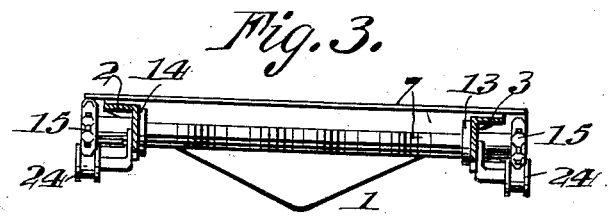

In the accompanying drawings: Figure 1 represents a top plan view of a potato digger constructed in accordance with this invention, Fig. 2 represents a side elevation thereof with parts broken out. Fig. 3 represents a transverse vertical section taken on line 3—3 of Fig. 1.

In the embodiment illustrated a plow or digger 1 is shown mounted at one end of a suitable frame in position to enter the ground and remove potatoes from the hills. This frame is preferably constructed of two angle irons 2 and 3 bolted or otherwise secured at their rear ends to hangers as 4, which are supported by and depend from the axle 5 on which the ground wheels, as 6, are mounted. These angle irons 2 and 3 are disposed a suitable distance apart and serpentine rods, as 7, are journaled at their opposite ends to turn in said irons. These rods 7 are each constructed in serpentine form with a bend 8 arranged at the center thereof and with similar bends 9 and 10 arranged near their opposite ends. Each bar is provided at its opposite ends with studs 11 and 12 which engage apertures in the angle irons or bars 2 and 3 and flanges 13 and 14 are provided at the inner ends of said studs and are adapted to engage the inner faces of the angle irons and prevent longitudinal movement of the rods. The stud 12 at one end of each rod 7 is made longer than the stud 11 to receive a sprocket pinion, as 15. The rods 7 are mounted in the angle irons with the long stud of one alternating with the short stud of the adjacent rod, as is clearly shown in Fig. 1. Sprocket wheels as 16 and 17 are fixed to a shaft 18 which is rotatably mounted in the upstanding brackets, as 19, bolted or otherwise secured to the angle irons 2 and 3. A pinion 20 is fixed to said shaft 18 and is designed to mesh with a driving gear wheel 21 mounted on the hub 22 of one of the ground wheels 6 and which is adapted to turn with said wheel and operate the pinion on the shaft 18 and the sprocket wheels carried thereby. Sprocket chains as 23 pass over the pinions 15 and around the sprocket wheels 16 and 17 whereby motion is imparted from said wheels to the pinions 15 which operate to turn the serpentine rods 7 forming the separator. Chain supporting rollers as 24 are arranged beneath the sprocket chains 23 to hold them in engagement with the pinions 15. The frame carrying the digger and the supporting bars 7 is designed to be raised and lowered by any suitable means, not shown.

In the operation of this apparatus the scoop or plow 1 being inclined digs into the ground and gathers up dirt and potatoes which are pushed in a mass up the incline by the forward movement of the machine and are deposited on the separator or cradle composed of the serpentine rods 7. These rods which are constantly revolving keep the mass in constant agitation thereby causing the dirt to drop through between the rods and the potatoes to pass backwardly and be deposited on the ground at the rear of the machine ready to be gathered.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

What I claim is:

1. In a potato digger the combination of a wheeled supporting frame, an inclined plow arranged at the front end thereof, a separating cradle arranged at the rear of said plow and composed of serpentine rods journaled at their opposite ends in said frame and means for rotating said rods operable by the ground wheels of the machine.

2. In a potato digger the combination of ground wheels, a frame mounted thereon composed of laterally spaced angle irons having an inclined plow mounted on the other end thereof and longitudinally spaced serpentine rods revolubly mounted in said angle irons, and means operable by the ground wheels for driving said rods.

3. In a potato digger the combination of ground wheels, a frame mounted thereon and composed of laterally spaced bars, a plow arranged at the front of said frame, a separating cradle arranged at the rear of said plow and comprising a plurality of longitudinally spaced rods having studs at the opposite ends thereof mounted in said bars, a pinion fixed to one end of each of said rods, a sprocket chain passing over said pinions and operable by said ground wheels for revolving the rods.

4. A separating cradle for a potato digger comprising laterally spaced supporting bars, a plurality of longitudinally spaced serpentine rods having studs at their opposite ends mounted in said bars, the stud at one end of said rods being longer than the other, the long stud of one bar being arranged to alternate with the short stud of the other, pinions fixed to said long studs, sprocket wheels mounted over said bars, sprocket chains passing over said wheels and the pinions at opposite sides of said cradle and means for operating said sprocket wheels.

5. A separating cradle for potato diggers comprising a supporting frame, a plurality of longitudinally spaced serpentine rods extending transversely of said frame, each of said rods having longitudinally extending studs at their opposite ends and flanges arranged adjacent the inner ends of said studs and means for revolving said serpentine rods.

In testimony whereof I have hereunto set my hand in presence of two subscribing witnesses.

GLYNDON A. FREER.

Witnesses:
    THADDEUS FRANCIS,
    IRA E. FREER.